June 15, 1937.  L. S. PONCHER ET AL  2,083,742
BUMPER GUARD
Filed Sept. 8, 1936   2 Sheets-Sheet 1

Inventors:
Louis S. Poncher
Jules B. Newman
By:
Jones Addington Ames & Seibold
Attorneys

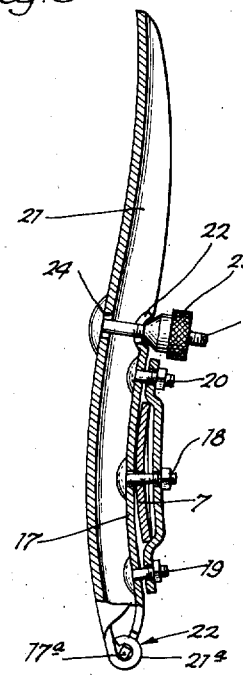

Patented June 15, 1937

2,083,742

UNITED STATES PATENT OFFICE 2,083,742

BUMPER GUARD

Louis S. Poncher and Jules B. Newman, Chicago, Ill.

Application September 8, 1936, Serial No. 99,695

13 Claims. (Cl. 293—55)

This invention relates to guards for automobile bumpers, with particular reference to guards adapted to be mounted on the front and rear bumpers in a position to protect the radiator and the trunk door, respectively.

In modern cars the radiator extends forwardly and terminates closely adjacent the front bumper where it is in a position to be easily damaged by the higher bumpers of other cars. Also, many modern cars are equipped with a rear trunk having a door hinged at the top and extending downwardly to a point closely adjacent the rear bumper. Heretofore it has been impossible to put the usual guards on the front bumper in a position to protect the radiator and still enable the use of a crank when necessary, and it has also been impossible to place guards on the rear bumper which would extend sufficiently high to protect the trunk door and still enable the door to be opened.

The present invention is directed to a movable guard which may be placed in the position specified whereby it will afford ample protection and, when mounted on the front bumper, may easily be moved to enable the use of a crank and may also easily be moved out of the path of the trunk door, when placed on the rear bumper.

It is an object of the present invention to provide a device of the character described which is conveniently adaptable to various types of bumpers and may easily be mounted in a suitable position to afford the desired protection.

A further object is the provision of a guard arranged to be rigidly mounted on a bumper in the path of a trunk door and moved out of the path of the door and returned to a position to protect the door, without the use of tools and without the necessity of removing the guard from the bumper.

A further object is the provision of a guard which will be neat in appearance, cheap to manufacture, easy to assemble, and which will not easily get out of order when in use.

It will, of course, be understood that the guard may be mounted to protect other parts of an automobile or equipment other than the radiator or trunk door and a plurality of the guards may be mounted on a single bumper if desired.

Further objects will be apparent from the specification and the appended claims.

In the drawings:

Fig. 5 is a side elevation of a slightly modified form of the invention;

Fig. 6 is a rear elevation of the embodiment illustrated in Fig. 5;

Fig. 7 illustrates another embodiment in which the guard proper is completely removable from the supporting parts;

Fig. 8 is a rear elevation of the embodiment illustrated in Fig. 7.

Fig. 9 illustrates another embodiment in which the guard is pivoted for sidewise movement; and Fig. 10 is a rear view of the embodiment illustrated in Fig. 9.

Figure 1:
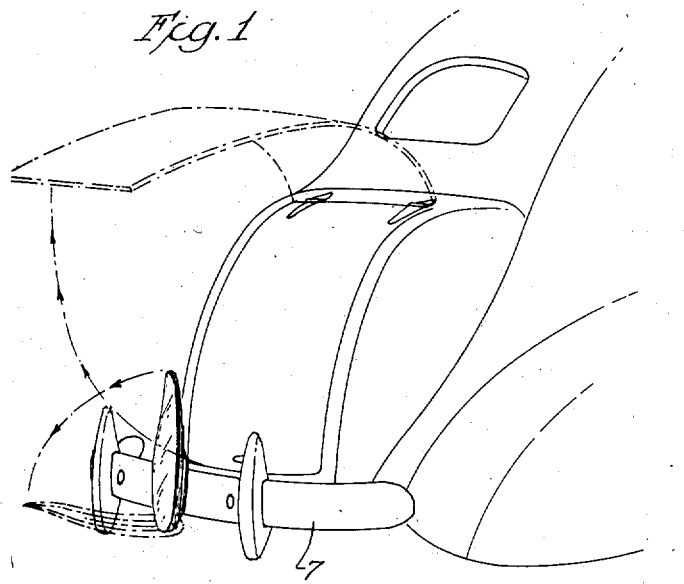
Figure 1 is a perspective view of the rear of an automobile and illustrates a guard comprising one embodiment of the invention, in position on the bumper and extending into the path of the door.
Figure 3:
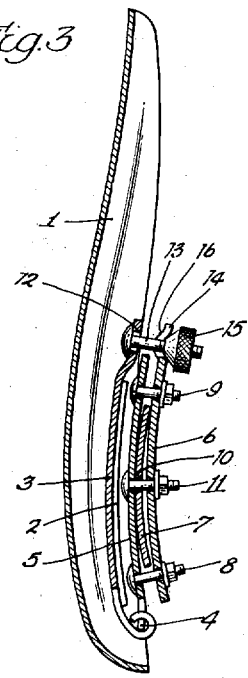
Fig. 3 is a vertical section through the guard and bumper and taken on a line substantially corresponding to line 3—3 of Fig. 2.
Figure 2:
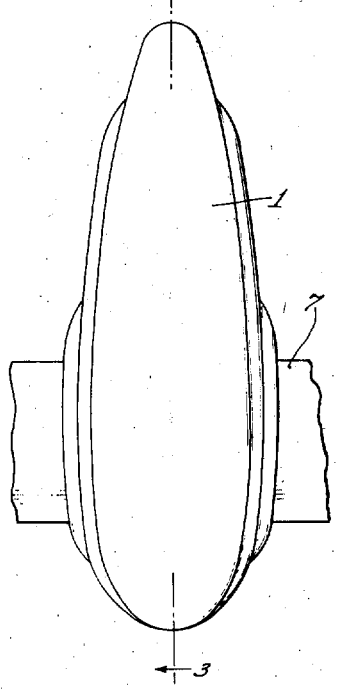
Fig. 2 is a front elevation of the embodiment illustrated in Fig. 1.
Figure 4:
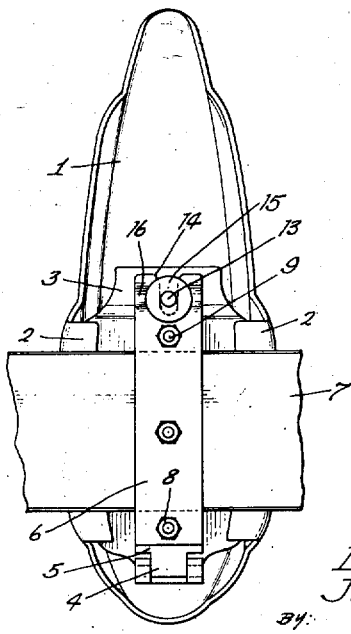
Fig. 4 is a rear elevation of the embodiment as illustrated in Fig. 3.

Referring to the drawings in detail, the embodiment illustrated in Figs. 1 to 4, inclusive, comprises a guard portion 1 which may be of any suitable size and design and preferably made of sheet metal such as cold-rolled steel or other suitable material. The guard portion 1 may be provided with inturned flanges 2, and these flanges may be spot welded or clamped or otherwise secured to a sheet metal member 3 which is inserted thereunder and which is hinged at 4 to a suitable supporting bracket 5. This supporting bracket 5 may be a comparatively narrow metal strap, shaped to substantially conform to the outer contour of a bumper and forms part of a clamping device including a metal strap 6, the latter conforming substantially to the inner contour. The members 5 and 6 are clamped on the opposite sides of the usual automobile bumper 7 by means of bolts 8 and 9. The members 5 and 6 are, of course, rigidly clamped in position, as shown. In many of the modern automobiles the bumpers are provided with a central opening 10 to receive a medallion, and wherever these openings are provided, a bolt 11 may also be used to clamp the members 5 and 6 securely to the bumper, as shown. The bracket 5 is preferably of quite rigid material, while the clamp member 6 is preferably of malleable or pliable material so that it may be bent to conform to the shape of the bumper.

The upper end of the guard member 3 extends slightly above the end of the bracket 5 and is provided with an enlarged opening 12 therethrough to receive a bolt 13. The bolt 13 extends through a slot 14 in the upper end of the bracket 5 as illustrated, and is provided with a thumb-nut 15 by which the upper portion of the guard may be securely fastened against the bumper. The thumb-nut 15 is preferably tapered, as illustrated, on one side, and the bracket 6, adjacent the slot 14, is preferably shaped as illustrated at 16 to substantially conform to the taper of the nut 15 and to retain the bolt and nut snugly in position when the device is fastened in place. The bolt 13 and nut 15 form a latch-like locking means whereby the guard may be easily locked and as easily released.

When it is desired to move the upwardly extending guard portion 1 in order to raise the trunk door or to provide access to the radiator, the thumb-nut 15 may be loosened and the enlarged opening 12 in the hinged member 3 permits the bolt to be raised sufficiently to allow the nut 15 to pass over the top of the bracket 6, and the guard portion may then be swung outwardly and downwardly, as indicated by dotted lines in Fig. 1. After the trunk door is closed, the guard may easily be raised and again rigidly clamped in position by means of the thumb-nut 15.

The embodiment illustrated in Figs. 5 and 6 is similar to that previously described, with the exception that the guard proper may be hinged directly to one of the clamping members and the securing means or latch pivoted on the guard itself. This embodiment comprises clamping members 17 and 18 which may be clamped to the bumper 7, in the same manner as the clamp members 5 and 6, previously described, by means of bolts 19 and 20. The guard proper may comprise a single piece of heavy sheet material 21 which may be formed to a desired shape and is hinged at 22 to the lower end of the clamp member 17. In this embodiment the lower end of the guard 21 is provided with ears 21a which are formed as shown around a T-shaped head 17a on the bracket 17. This provides a cheap and efficient hinge. The clamp member 18 extends upwardly above the bumper, as illustrated, and is slotted at 22. A bolt 23 is loosely mounted in the guard member at 24 and provided with a thumb-nut 25 whereby the device may be secured in place in the same manner as the embodiment previously described.

In Fig. 7 is illustrated an embodiment in which a guard member 26 may be formed of any desired material and when released may be lifted upwardly to remove it from a socket on one of the clamping members. In this embodiment a guard member 26 is provided with a wedge-shaped connector portion 27 on its inner surface and arranged to engage in a corresponding wedge-shaped socket 28 formed on, or attached to, a clamping member 29. This clamping member 29 is secured to the bumper 7 by means of a corresponding clamping strap 30 and bolts 31 and 32. The clamping member 29 extends upwardly slightly above the bumper and is slotted at 33 to receive a bolt 34 which may be rigidly secured to the guard portion 26. A thumb-nut 35 is provided on the bolt 34, and it will be apparent that when this thumb-nut 35 is sufficiently loosened, the guard 26 may be raised upwardly and thereby disengaged from the socket 28.

Figs. 9 and 10 illustrate still another embodiment in which clamping members 36 and 37 are provided for clamping engagement with the bumper and are secured by means of bolts 38 and 39. The clamping member 36 extends downwardly below the bumper, and the guard portion 40 is provided with an inwardly extending bolt 41 which extends through a corresponding opening in the lower end of the clamp 36 and is provided with a spring 42 secured thereon by means of a nut 43. The upper end of the clamp member 36 is provided with a slot 44 arranged to receive a bolt 45 which is loosely mounted in a suitable opening in the guard member and extends through the slot 44 and is provided with a thumb-nut 46.

In this construction it will be apparent from the drawings that when the nut 46 is sufficiently loosened the bolt 45 may be raised upwardly out of the slot 44 and the guard 40 may then be moved sidewise on the spring-pressed pivot bolt 41.

Further modifications will be apparent to those skilled in the art, and it is desired, therefore, that the invention be limited only by the prior art and the scope of the appended claims.

Having thus described this invention what is claimed and desired to be secured by Letters Patent is:

1. In a device of the character described, a bumper, a guard extending transversely thereof and substantially longer than the width of said bumper, one end of said guard being hinged to for movement transversely of said bumper, and releasable means for locking the upper end of of said guard in fixed relation to said bumper.

2. An automobile accessory comprising an elongated guard for an automobile bumper, a clamping means hinged to said guard adjacent the lower end of said guard and constructed and arranged to be rigidly clamped to said automobile bumper to support the guard member for movement transversely of said bumper, and releasable means for locking the upper end of said guard in fixed relation to said clamping means.

3. A device of the character described comcomprising a mounting means constructed and arranged to be secured to a bumper, a guard supported on said mounting means for movement transversely of said bumper, said guard normally extending beyond one edge of said bumper, and means for rigidly securing said guard against said relative movement, said last means being releasable to enable said relative movement.

4. A device of the character described comprising a mounting means constructed and arranged to be secured to a bumper, a guard hingedly connected to said mounting means for movement transversely of said bumper and extending transversely substantially beyond the edges of said bumper, and releasable means for rigidly securing said guard against swinging movement on said hinge.

5. A device of the character described comprising an elongated guard member arranged to extend a substantial distance above a bumper when mounted thereon, a mounting means secured to said bumper and extending beyond both edges thereof, said guard member being hinged to the lower end of said mounting means, and means releasably securing said guard member to the upper end of said mounting means.

6. A device of the character described comprising an elongated guard member arranged to extend a substantial distance above a bumper when mounted thereon, a mounting means comprising a bracket fixedly secured to said bumper, said guard member being hinged adjacent the lower end of said bracket for transverse movement relative to said bumper, a latch remote from said hinge for connecting said guard member to said bracket, and means for tightening said latch to maintain said guard member rigidly in latched position.

7. A guard for an automobile, having a bumper and a trunk door arranged to open in a path closely adjacent said bumper, said guard comprising a transverse member mounted on said bumper and normally extending into the path of said door and freely movable transversely of said bumper to a position out of said path to permit the door to be opened, and releasable means for locking said guard in said path.

8. A guard for an automobile having a bumper and a trunk door arranged to open in a path closely adjacent said bumper, said guard comprising a transverse member mounted on said bumper and extending into the path of said door and hinged adjacent the lower edge of said bumper for swinging movement out of said path, and means for releasably securing said guard to extend into said path of said door.

9. A device of the character described comprising a bracket arranged to be rigidly secured transversely of an automobile bumper, a guard hinged to one end of said bracket for movement away from said bumper, and means carried by said guard for securing said guard to the opposite end of said bracket, said securing means comprising an outwardly extending threaded bolt arranged to engage in a slot in said bracket, and a nut on said bolt for rigidly securing said guard.

10. A device of the character described comprising a bracket constructed and arranged to be mounted on a bumper, an elongated guard extending transversely of said bumper, interengaging means on said bracket and said guard and arranged to enable disengagement by movement of said guard, and releasable means cooperating with said guard and said bracket for releasably locking said guard against disengagement.

11. A device of the character described comprising a bracket constructed and arranged to be rigidly secured on a bumper, a guard pivotally mounted on said bracket for transverse movement relative to said bumper, said guard extending a substantial distance above said bumper, said pivotal connection comprising a T-shaped head on said bracket, and ears formed integrally on said guard and around the arms of said T head.

12. A device of the character described comprising a bracket constructed and arranged to be rigidly secured on a bumper, a guard pivotally mounted on said bracket for lateral movement relative thereto, said guard extending a substantial distance above said bumper, said pivotal connection comprising a bolt extending from said bumper through said bracket and having a compression spring thereon tending to press said guard and said bracket together, and releasable means for rigidly securing said guard to said bracket.

13. A guard for an automobile having a rear door arranged to open in a path closely adjacent the bumper, said guard comprising a member extending upwardly from said bumper and into the path of said door, said guard being hingedly mounted on said bumper for swinging movement out of the path of said door, and means for normally retaining said guard in said path.

LOUIS S. PONCHER.
JULES B. NEWMAN.

CERTIFICATE OF CORRECTION.

Patent No. 2,083,742.   June 15, 1937.

LOUIS S. PONCHER, ET AL.

It is hereby certified that error appears in the printed specification of the above numbered patent requiring correction as follows: Page 2, second column, lines 31, 32 and 33, claim 1, strike out the words "for movement transversely of said bumper, and releasable means for locking the upper end of of said guard in fixed relation to said bumper" and insert instead said bumper adjacent one edge thereof, and means for releasably clamping the opposite end of said guard in fixed relation to said bumper; and that the said Letters Patent should be read with this correction therein that the same may conform to the record of the case in the Patent Office.

Signed and sealed this 29th day of June, A. D. 1937.

Henry Van Arsdale (Seal)   Acting Commissioner of Patents.

a bracket fixedly secured to said bumper, said guard member being hinged adjacent the lower end of said bracket for transverse movement relative to said bumper, a latch remote from said hinge for connecting said guard member to said bracket, and means for tightening said latch to maintain said guard member rigidly in latched position.

7. A guard for an automobile, having a bumper and a trunk door arranged to open in a path closely adjacent said bumper, said guard comprising a transverse member mounted on said bumper and normally extending into the path of said door and freely movable transversely of said bumper to a position out of said path to permit the door to be opened, and releasable means for locking said guard in said path.

8. A guard for an automobile having a bumper and a trunk door arranged to open in a path closely adjacent said bumper, said guard comprising a transverse member mounted on said bumper and extending into the path of said door and hinged adjacent the lower edge of said bumper for swinging movement out of said path, and means for releasably securing said guard to extend into said path of said door.

9. A device of the character described comprising a bracket arranged to be rigidly secured transversely of an automobile bumper, a guard hinged to one end of said bracket for movement away from said bumper, and means carried by said guard for securing said guard to the opposite end of said bracket, said securing means comprising an outwardly extending threaded bolt arranged to engage in a slot in said bracket, and a nut on said bolt for rigidly securing said guard.

10. A device of the character described comprising a bracket constructed and arranged to be mounted on a bumper, an elongated guard extending transversely of said bumper, interengaging means on said bracket and said guard and arranged to enable disengagement by movement of said guard, and releasable means cooperating with said guard and said bracket for releasably locking said guard against disengagement.

11. A device of the character described comprising a bracket constructed and arranged to be rigidly secured on a bumper, a guard pivotally mounted on said bracket for transverse movement relative to said bumper, said guard extending a substantial distance above said bumper, said pivotal connection comprising a T-shaped head on said bracket, and ears formed integrally on said guard and around the arms of said T head.

12. A device of the character described comprising a bracket constructed and arranged to be rigidly secured on a bumper, a guard pivotally mounted on said bracket for lateral movement relative thereto, said guard extending a substantial distance above said bumper, said pivotal connection comprising a bolt extending from said bumper through said bracket and having a compression spring thereon tending to press said guard and said bracket together, and releasable means for rigidly securing said guard to said bracket.

13. A guard for an automobile having a rear door arranged to open in a path closely adjacent the bumper, said guard comprising a member extending upwardly from said bumper and into the path of said door, said guard being hingedly mounted on said bumper for swinging movement out of the path of said door, and means for normally retaining said guard in said path.

LOUIS S. PONCHER.
JULES B. NEWMAN.

CERTIFICATE OF CORRECTION.

Patent No. 2,083,742.         June 15, 1937.

LOUIS S. PONCHER, ET AL.

It is hereby certified that error appears in the printed specification of the above numbered patent requiring correction as follows: Page 2, second column, lines 31, 32 and 33, claim 1, strike out the words "for movement transversely of said bumper, and releasable means for locking the upper end of of said guard in fixed relation to said bumper" and insert instead said bumper adjacent one edge thereof, and means for releasably clamping the opposite end of said guard in fixed relation to said bumper; and that the said Letters Patent should be read with this correction therein that the same may conform to the record of the case in the Patent Office.

Signed and sealed this 29th day of June, A. D. 1937.

Henry Van Arsdale (Seal)                                   Acting Commissioner of Patents.

CERTIFICATE OF CORRECTION.

Patent No. 2,083,742.   June 15, 1937.

LOUIS S. PONCHER, ET AL.

It is hereby certified that error appears in the printed specification of the above numbered patent requiring correction as follows: Page 2, second column, lines 31, 32 and 33, claim 1, strike out the words "for movement transversely of said bumper, and releasable means for locking the upper end of of said guard in fixed relation to said bumper" and insert instead said bumper adjacent one edge thereof, and means for releasably clamping the opposite end of said guard in fixed relation to said bumper; and that the said Letters Patent should be read with this correction therein that the same may conform to the record of the case in the Patent Office.

Signed and sealed this 29th day of June, A. D. 1937.

Henry Van Arsdale (Seal)   Acting Commissioner of Patents.